FIG. 1

HELLMUTH WALTER
INVENTOR.

June 4, 1957      H. WALTER      2,794,429
ROTARY TYPE COMBUSTION ENGINE Filed May 27, 1954      9 Sheets-Sheet 2

FIG. 2

HELLMUTH WALTER
INVENTOR

FIG. 3

HELLMUTH WALTER
*INVENTOR.*

HELLMUTH WALTER
*INVENTOR.*

BY

June 4, 1957  H. WALTER  2,794,429
ROTARY TYPE COMBUSTION ENGINE
Filed May 27, 1954  9 Sheets-Sheet 5

FIG. 5

HELLMUTH WALTER
INVENTOR.

BY Robe Meyer
atty

HELLMUTH WALTER
INVENTOR.

FIG. 8

HELLMUTH WALTER
INVENTOR.

_United States Patent Office_ 2,794,429
Patented June 4, 1957

2,794,429

ROTARY TYPE COMBUSTION ENGINE

Hellmuth Walter, Upper Montclair, N. J.

Application May 27, 1954, Serial No. 435,014

37 Claims. (Cl. 123—13)

This invention relates generally to internal combustion engines and more particularly to a rotary type internal combustion engine which produces combustion at constant volume.

The direct conversion of the energy of combustion into rotary motion, as in a rotary type internal combustion engine shown in Patent No. 1,003,263, has distinct advantages both from the standpoint of manufacture, performance, size, and operational maintenance over those type engines in which the conversion is through reciprocating means, i. e., pistons and connecting rods, etc. In addition, with recent expansion of the gas turbine field, it has been found that this type of rotary engine can be utilized to supply the working medium for driving the turbine.

However, inherent defects in prior engines of this type affected their commercial feasibility. First, the intense heat of the combustion gases coupled with the additive effect of friction developed by the rolling or sliding type of contact between the lobe ends or their packing, eroded and burned the sealing faces therebetween and in addition distorted both the working lobes and the housing itself, especially if the sealing surfaces were improperly lubricated or an oil cake formed, to a point where leakage between the respective compression, combustion and expansion steps of the engine cycle became so great that the efficiency of the engine was seriously affected and reduced. Second, the sealing arrangements, due to friction, did not allow for high speed operation. And third, the exhaust gases were not properly scavenged usually being added to the suction intake which reduced the power output and hence the efficiency of the engine.

The present invention overcomes these difficulties by providing a rotary type internal combustion engine having at least one working lobe and one combustion lobe generated and designed to produce the most desired compression ratio wherein the operation thereof is so regulated that the lobes though coacting do not contact each other but nevertheless produce the respective compression, combustion and expansion cycle of the engine, the "through put" of the engine produced by the speed of operation being so large that the actual leakage between the working lobe and the combustion lobe will not materially affect the resultant reduction of the efficiency to a point below that of a comparable standard type engine.

The present invention further disposes the exhaust outlet and suction inlet with respect to the working lobe that the speed of operation allows one portion of the air introduced through the suction inlet to be bypassed to the exhaust space of the engine, to scavenge the combustion gases and to control the temperature thereof. At the same time another portion of the air can be passed to the compression space of the engine to initiate the combustion cycle thereof.

The present invention furthermore provides positive cooling in the housing and more particularly in the lobes to prevent overheating thereof and of the housing which might cause distortion or destruction of the lobe faces or the housing itself.

It is an object of the present invention to provide a method for generating the working and combustion lobes for the rotary type engine and to provide a means whereby these lobes can be set at the most desirable clearance between the adjacent working faces so as to minimize leakages therebetween.

It is also an object of the present invention to reduce power losses between the respective compression, combustion and expansion spaces caused by pockets of high pressure or vacuum formed between the working lobe, the combustion lobe, and the housing at the ends of the respective compression spaces, and combustion spaces by reducing the corners of the housing which form these spaces or by providing by-passages therebetween.

It is another object of the present invention to provide means to dampen the vibrational effects between the working lobe and the power take-off coupling connected thereto.

It is another object of the present invention to provide a rotary combustion engine which will operate with substantially continuous exhaust flow of combustion gases at high temperature, as a driving means for a prime mover or for any other desired use.

It is an object of the present invention to cover a means for scavenging the exhaust gases and to cool the exhaust gases down to a point where they are acceptable for use in a prime mover such as a gas turbine.

With this and other objects in view, as may appear from the accompanying specification, the invention consists of various features of construction and combination of parts, which will be first described in connection with the accompanying drawings, showing a rotary type combustion engine of a preferred form embodying the invention, and the features forming the invention will be specifically pointed out in the claims.

Figure 1:
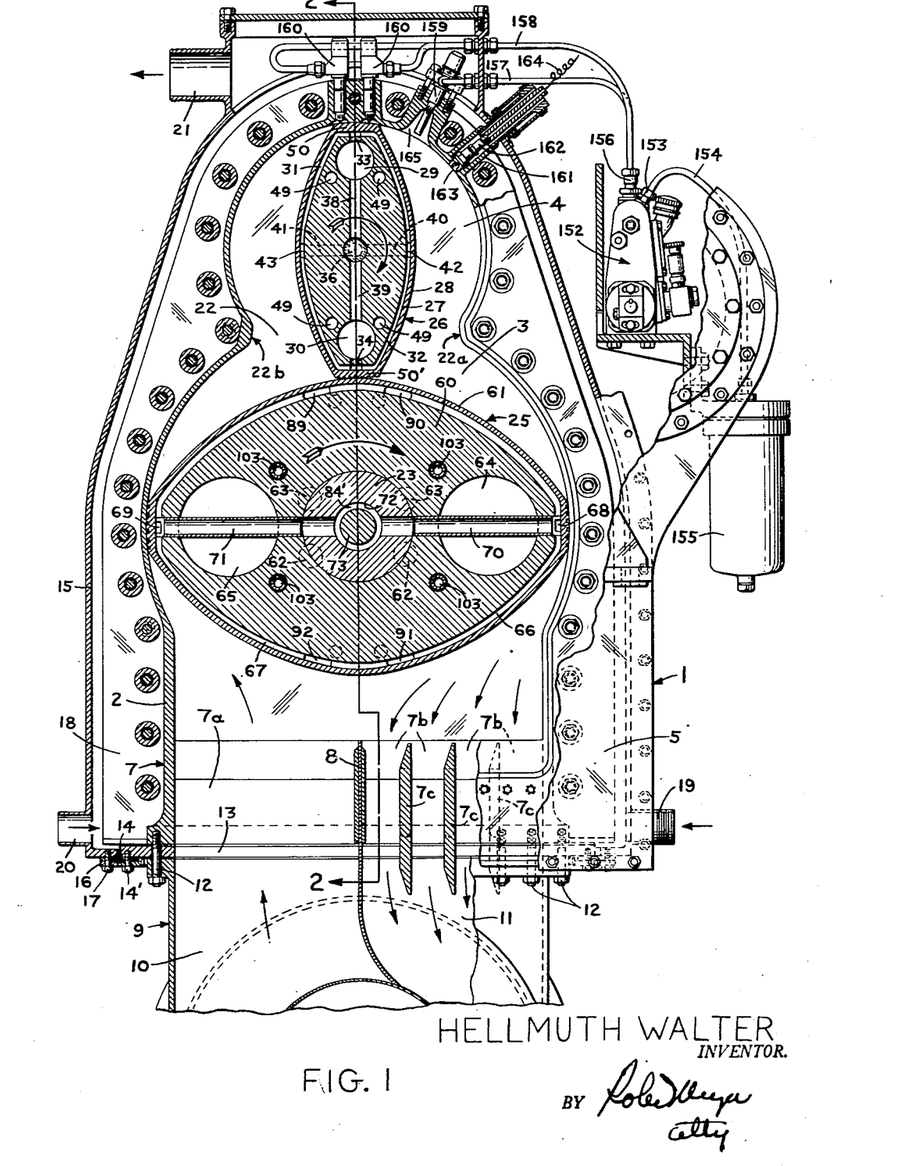
Figure 1 is a transverse section showing the invention taken on line 1—1 of Figure 2.
Figure 3:
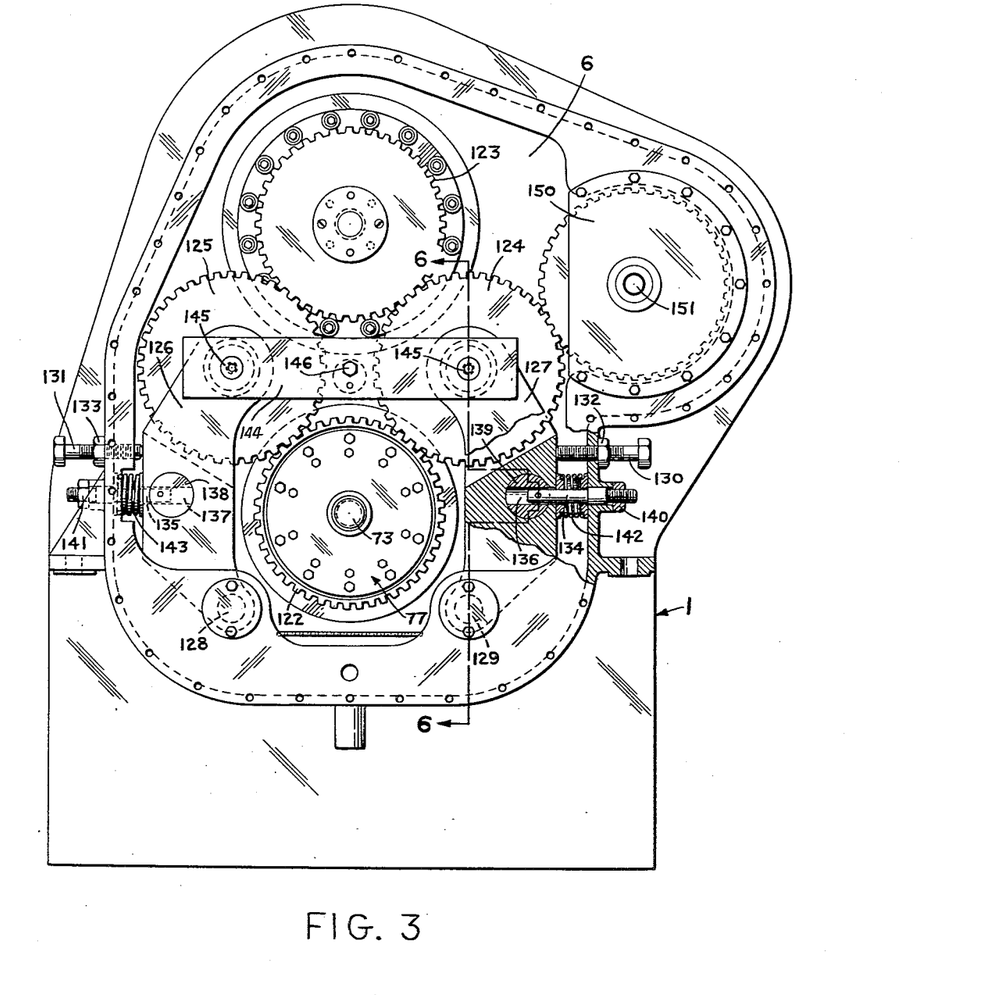
Figure 3 is an end view showing the driving gears and means for regulating clearances between lobes.

Referring to the drawings, the rotary combustion engine generally designated 1 includes an inner pressure casing 2 forming a working chamber or cylinder 3 and a communicating combustion chamber 4 when closed by the closure plates or heads 5 and 6 at either side thereof, as is shown in Figures 1 and 3, the inner pressure casing 2 is provided with a common duct 7 forming suction inlet 7a and exhaust outlet 7b divided by a thin partition 8 as indicated in Figure 1, or they may be separate ducts, provided they can be kept in substantially continuous communication with each other. The vanes 7c divide the exhaust passage into sections so that combustion gases exhausting from the working cylinder 3 will expand down the outermost section of the exhaust therethrough the respective inner sections. The construction produces initially an ejector action which draws air from the suction inlet 7a through the exhaust outlet 7b with the exhaust thereby cooling the exhaust.

The air delivered to the suction inlet 9 can be connected either to a source of air at atmospheric action, whereby air enters the inlet 9 under differential pressure due to the exhaust action of the combustion gases through an ejector diffuser as more fully shown and described in my copending application Serial No. 540,481, filed October 14, 1955, or to a source of air at pressures above atmospheric pressure, as would be effected through a blower, turbo-compressor and the like device as is well known in the art. It being understood that when air is delivered at pressures in excess of atmospheric pressure that a higher intake by weight of air is effected in the compression stage of the combustion cycle which produces a related increase in the power of the engine.

A conduit 9 connects the source of air to the duct 7, and forms a separate inlet passage 10 and an adjacent discharge passage 11 connected to the common duct 7 as by threaded members 12 which also act to hold a spacer chamber 13. The spacer 13 is connected to the inner side of a circumferentially disposed yieldable member 14 as by threaded members 14'. The outer edge of the yieldable member 14 is connected to a cooling jacket 15 about the inner pressure casing 2 by a suitable annular ring 16 and threaded members 17 as is clearly shown in Figures 1 and 2 of the drawings. The yieldable member acts as both a closure for the cooling fluid passage 18 formed between the cooling fluid jacket 15 and the pressure casing 2, and as a means to allow for relative expansion and contraction of the pressure casing 2 relative to the cooling fluid jacket 15 under thermal changes.

The cooling fluid passage is provided with inlets 19 and 20, disposed on opposite sides of the inner pressure casing, connected to a source of auxiliary cooling fluid such as water (not shown). This cooling means in the apparatus is to be distinguished from that for the lobes hereinafter described. Fluid inlet valves (not shown) may be provided for the respective sides of the cooling fluid passage so that the cooling fluid can be controlled to flow to a greater extent on one side than the other side of the inner casing as the exhaust side thereof will be hotter than the compression side. A cooling fluid outlet 21 for the cooling fluid passage will lead the cooling fluid away from the rotary combustion engine.

Along the axial line of cylinder 3 is a shaft 23 having a working lobe 25 fixedly connected thereto. The shaft and the lobe are mounted in bearings 23a and 23b disposed in the respective closure plates or heads 5 and 6.

Similarly in the axial line of the combustion chamber 4 is a shaft 24 having a combustion lobe 26 formed integrally therewith. The portions of the shaft 24 adjacent the side faces of the lobe 26 are provided with annular collars 24a and 24b having press fitted annular bearings 24c and 24d in their inner circumferences to rotatably mount the shaft and the lobe on the outer circumference of hollow axle support structures 24e and 24f in turn connected and supported by the respective closure plates or heads 5 and 6. Guide bearings 24g and 24h further support the shaft 24 where the central portions thereof extend through the hollow portion of the axle structures 24e and 24f.

Figure 2:
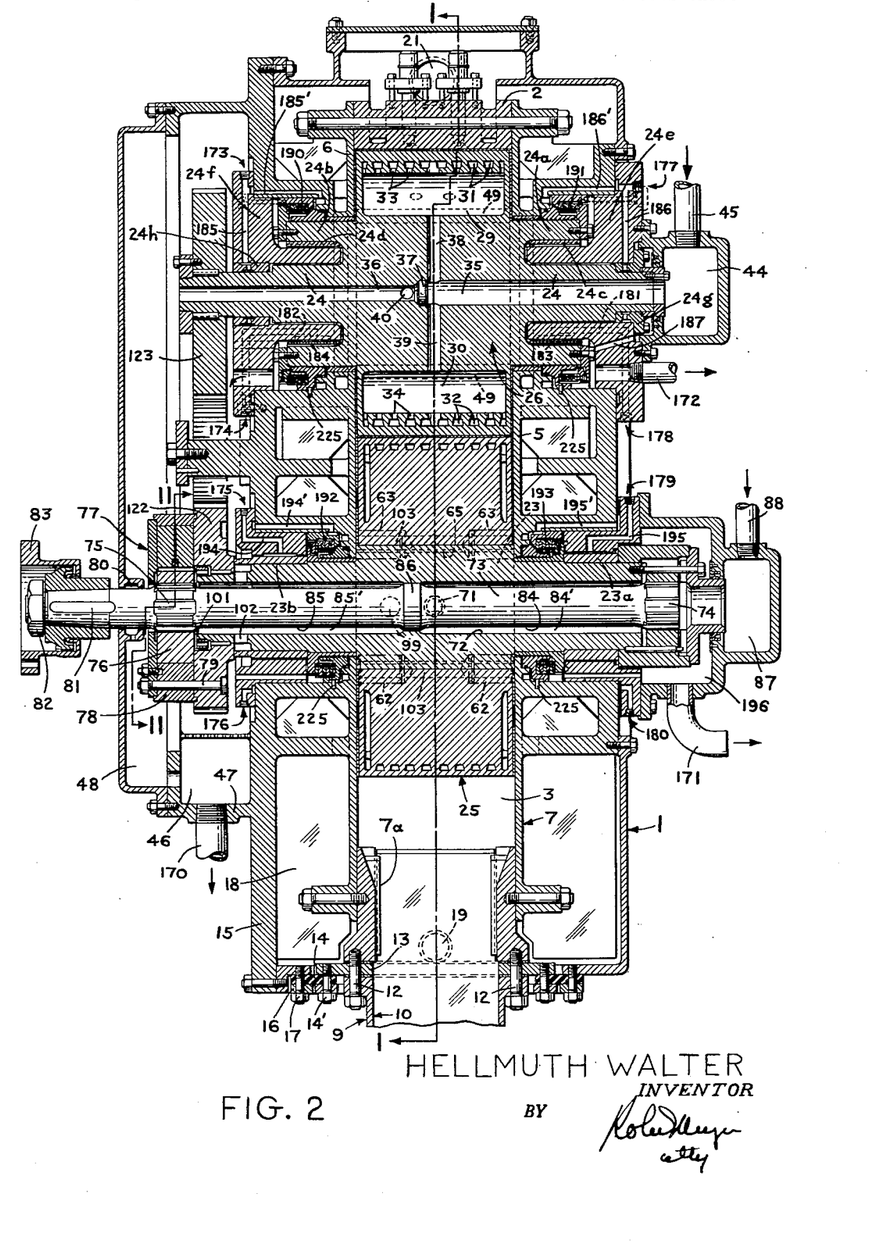
Figure 2 is a longitudinal section showing the invention taken on line 2—2 of Figure 1.

In addition, as further shown in Figures 2 and 3, the shafts 23 and 24 respectively are extended past the respective bearing structures 23b and 24h, outwardly of the closure head 6 where they connect to and rotate the driven gears 122 and 123. The driven gears 122 and 123 are connected to and coact with means for adjusting the relative clearance between the edges and sides of the lobes 25 and 26, further means being provided to adjust back lash between the driven gears and the means for adjusting the clearance, as is hereinafter described. The importance of such clearance space between the edges and sides of the coacting lobes 25 and 26 and the means to adjust this clearance will appear clear from the operation of the rotary combustion engine as hereinafter described.

The working cylinder 3 and combustion cylinder 4 are shown as having circular form, with their axial lines disposed in fixed relation to each other so that the cylinders overlap to form the communicating passage 22 therebetween. The normal extension of the inner walls of the cylinders to the communicating passage 22 would produce a sharp shoulder on both sides at the overlapping position, so that during rotation of the lobes in regular operation as hereinafter described pockets of high pressure or low pressure on the respective compression and exhaustion sides would be formed by lobes. Accordingly, to avoid this difficulty the by-passes are formed by cutting back the shoulders as at 22a and 22b clearly shown in Figure 1 of the drawings.

*Generating and designing cylinder and lobes*

Figure 7:
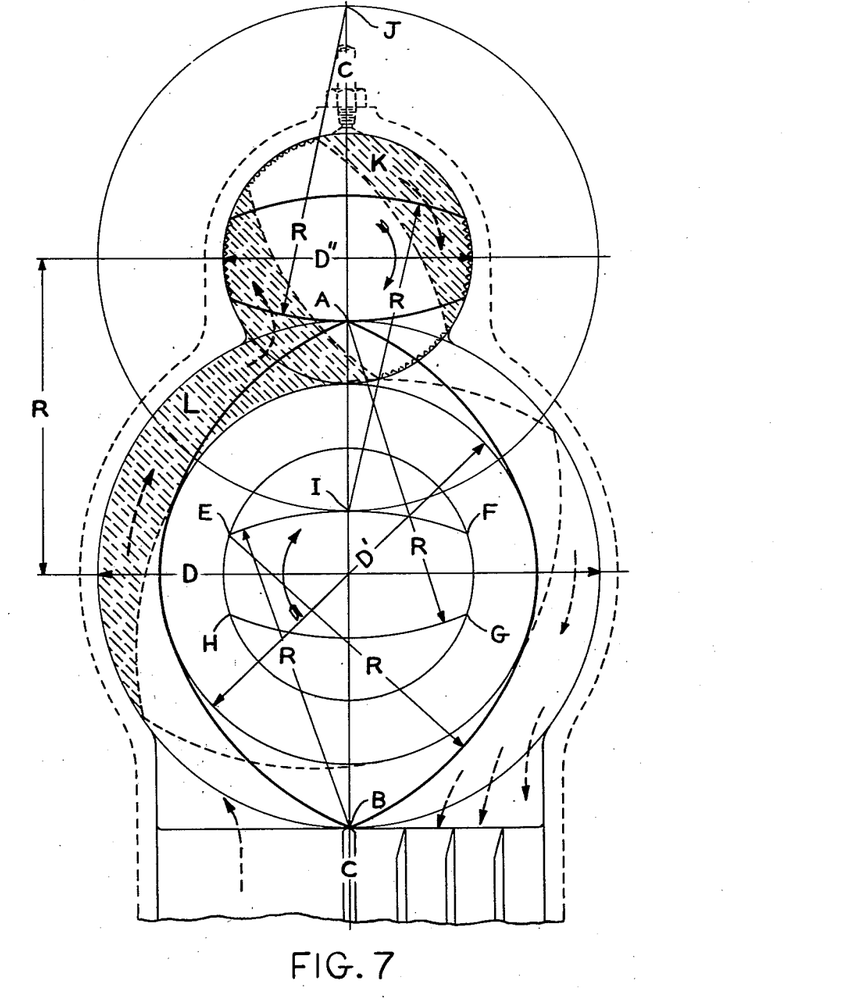
Figures 7 and 8 are diagrammatic sketches illustrating the geometry of designing the respective lobes and housing to produce the desired compression ratio.
Figure 8:
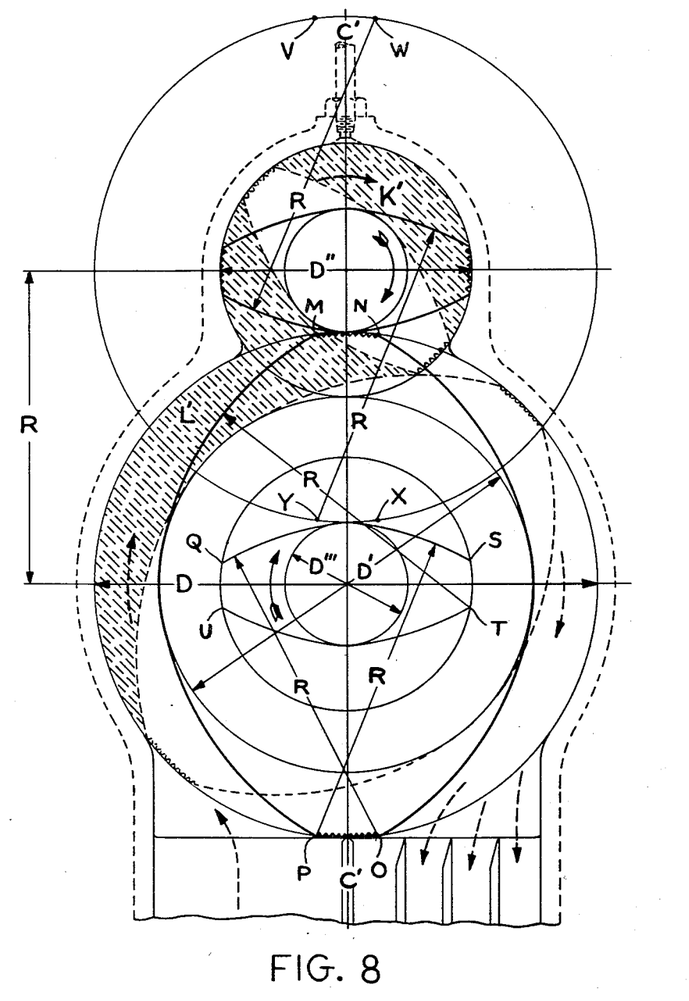

The working chamber or cylinder 3 and the combustion chamber cylinder 4 are shown having cylindrical shapes. In order to produce the desired ratio of compression these cylindrical shapes, and the corresponding oval type shapes of the pistons or lobes 25 and 26 are generated geometrically as illustrated in Figure 7 of the drawings. In Figure 8, means for generating a modified shape for the lobes is illustrated.

Thus referring first to Figure 7, concentric circles are drawn having arbitrary diameters D and D' which represent the diameters of the working cylinder 3 and the widest portion of the working lobe 25, while a third circle also having an arbitrary diameter D'', representing the combustion cylinder 4 is drawn so that its center lies a spaced distance R from the centers of the concentric circle D and D' on a line C whereby the circle D'' is contiguous to a point on the circumference representing the working lobe diameter D', intercepted by the line C.

The spaced distance R is now utilized to establish the respective shapes of the coacting working lobe and the combustion lobe and the relationship between the areas defined by these delineated shapes and the respective circumference of the working cylinder and the combustion cylinder will provide means to establish a substantially accurate delineation of the compression ratio for the rotary combustion engine.

The method of establishing the respective shapes is begun by forming the shape of the combustion lobe first, this is done by inscribing the circle D'' on the same center as the circles D and D'. Surfaces of the combustion lobe are now generated by striking arcs having a radius equal to the distance R from the respective points A and B formed by the intersection of the line C and the circle D which arcs in turn are swung to intersect the inscribed circle at points E, F, G and H, thus outlining the shape of the combustion lobe 26. From these points the shape of the working lobe 25 is formed by striking arcs also having a radius equal to the distance R from the respective points E, F, G and H, only point E is illustrated to preserve clarity in the figure, all of which is clearly shown in Figure 7 of the drawing.

In order to calculate the compression ratio the shape of the combustion lobe is established in the combustion cylinder by circumscribing the circle D on the center for the circle D'' and then generating the outline by striking arcs having radii equal to the distance R from the points I and J where the circumscribed circle D intersects the line C.

From the relationship of the cross-hatched areas marked K and L respectively, representing the combustion space and the compression space diagrammatically, the respective theoretical compression ratio for the combustion engine is calculated from the equation:

$$\frac{P_2}{P_1} = \frac{(L)^n}{(K)^n}$$

wherein $n=1.4$ for an ideal gas in the manner well known in the art.

It has been found that where diameter D″ is selected to be approximately ½D that a compression ratio of approximately three to one can be secured, which compression ratio is most suitable for certain commercial application, although it is clear that the compression ratio can be varied very simply by varying the diameter D′ of the working lobe or D″ of the combustion cylinder as this varies the ratio between the respective working and combusion lobes and the cylinders, hence the areas K and L.

In Figure 8, a second method of establishing a working lobe and a combustion lobe is illustrated where it is desired to increase the sealing width of the end of the working lobe and/or to modify the compression ratio of the rotary combustion engine.

Thus the initial steps will be the same, arbitrary diameters D, D′ and D″ being selected for the circles representing the diameter of the working cylinder, the widest portion of the working lobe and combustion cylinder respectively and to provide the spaced distance R.

As in Figure 7 the combustion lobe is now shaped by inscribing a third circle of diameter D″ on the center for the circles D, D′ and striking arcs having a radius equal to R from respective points M, N, O and P on the circle D each equidistant from the center line C′, which arcs are extended to intersect the third inscribed circle of diameter D″ at the points Q, S, T and U tangential to a fourth inscribed circle D‴ having its center the same as circles D, D′ and D″ and a diameter equal to twice the length of R less the length of diameter D, only two points S and T are illustrated for clarity. From these points Q, S, T and U the shape of the working lobe is formed by striking arcs having a radius equal to R, and extending these arcs to intersect the respective points M, N, O and P at one end and tangent to the inscribed circle of diameter D′ at the other end, only one arc from point T being illustrated for clarity, as is clearly shown in Figure 8 of the drawings.

The combustion lobe must once again be drawn into the combustion cylinder circle by circumscribing the circle D and inscribing the circle D‴ on the center for the circle D″, and then striking arcs from equivalent points on the circumscribed circle D equal to the points M, N, O and P, as at V, W, X and Y to delineate the desired shape.

The cross-hatched sections K′ and L′ are also used to calculate the compression ratio as described above for the form of the lobes as shown in Figure 7 of the drawings.

It will be pointed out that while the geometric illustration for establishing the lobes indicates the lines as touching, it is obvious that in fabrication the tolerance limits can be such that when connected to the means for adjusting the clearance that the desired minimum clearances will be established.

It is further understood that the development of the desired shapes of the lobes is not limited to the specific methods described but that to any arbitrary select shape of one lobe a correlated shape for the coacting lobe will be generated.

The lobes

Combustion lobe 26 comprises a solid body portion 27 and a skin casing 28 connected to the solid body portion 27 by any suitable means such as welding. The body portion 27 formed integral with the shaft 24 has axially disposed chambers 29 and 30 formed therein on opposite sides of the shaft 24, and substantially parallel thereto.

Disposed about the sides and ends of the combustion lobe 26 are U-shaped cooling passages 31 and 32 which communicate through connecting passages 33 and 34 with the respective chambers 29 and 30.

Shaft 24 is provided with an axially or longitudinally disposed inlet bore 35 and outlet bore 36 opening inwardly from opposite ends thereof and separated at their inner ends by the center plug or section 37 so that transverse inlet passages 38 and 39 will provide communication between the chambers 29 and 30 and the inlet bore 35 and transverse outlet passages 40 and 41 will provide communication between return passages 42 and 43 communicating with the cooling passages 31 and 32 and the outlet bore 36, all of which is clearly shown in Figures 1 and 2 of the drawings.

Cooling fluid introduced into the chamber 44 through the conduit 45 connected thereto, as hereinafter described, passes into the inlet bore 35 communicating directly with the chamber 44, thence through the transverse inlet passages 38 and 39 to the chambers 29 and 30. It passes from the chambers 29 and 30 through the connecting passages 33 and 34 to the U-shaped cooling passages 31 and 32 and thence to the return passages 42 and 43 where it is returned through the outlet passages 40 and 41 and outlet bore 36 to the sump 46 formed by the gear housing 47 and gear cover 48. During the passage of the fluid through the U-shaped cooling passages 31 and 32 it absorbs heat from the skin casing 28 by heat exchange relation therewith.

Figures 1 and 2 further show that there are pressure equalizing bores 49 extending through the solid body portion substantially parallel to the axis of the shaft 24, to balance the pressures which will occur between the respective sides of the lobe 26 and the end walls formed by the cover elements 5 and 6.

Figures 4, 5A, 10:
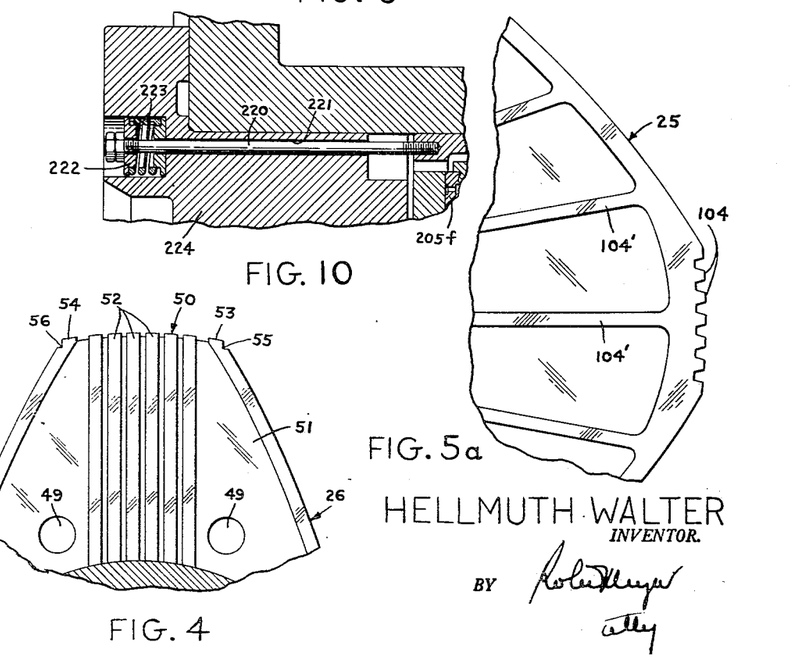
Figure 4 shows an enlarged view of one end of the small lobe.
Figure 5a shows a side view of the large lobe broken away to show the flow channels for coolant.
Figure 10 is a partial section of the bearing frame showing means for applying tension to the lubricating rings.

Figures 1 and 4 show that the end portions 50 and 50′ of the combustion lobe 26 and the sides 51 have sealing lands 52 which lands act to seal against the differential pressure developed between the various stages of the combustion cycle during rotation of the lobe.

Since the combustion lobe 26 must seal against considerably higher pressures than the working lobe 25, it is necessary that the respective corners 53 and 54 on opposite sides of the ends 50 and 50′ must be established with accuracy. This is accomplished by forming the cut-out sections 55 and 56 on either side.

Referring now to the working lobe 25, it is similarly formed and thus includes solid body portion 60 and a skin casing 61 which is attached thereto by any suitable manner. The body portion is keyed as at 62 and 63 to the shaft 23. In addition, longitudinal chambers 64 and 65 are provided on opposite sides of the shaft 23 substantially parallel thereto. About the ends and sides of the working lobe between the solid portion 60 and the skin casing 61 are the U-shaped cooling passages 66 and 67 having common passages 68 and 69 at either end communicating with the transverse inlet passages 70 and 71, as is clearly shown in Figure 1 of the drawings.

The shaft 23 of the working lobe differs somewhat from that of the combustion lobe 24 because it acts as a driving member. Thus, Figure 2 shows shaft 23 having a single hollow bore 72 in which is disposed axially a comparatively flexible inner shaft 73. The inner shaft is splined at one end as at 74 to the shaft 23 while the other end is splined as at 75 to the annular inner elements 76 of a relative motion damper generally designated 77, the outer annular element 78 of which is fixedly connected as by circumferentially spaced threaded members 79 to the driven gear 122 fixedly mounted on the shaft 23, whereby the inner shaft 73 will rotate with the shaft 23 and the relative motion damper 77, hereinafter more fully described will act to cushion vibration shocks between the main shaft 23 and the inner shaft 73 during operation.

The inner shaft 73 extends past the relative motion damper through the gear cover 48 as at 80 to the exterior of the rotary combustion engine where it is fixedly connected by a key 81 and nut 82 to a power take-off member 83. The engine can drive off this power take-off element or as described hereinafter the machine may be started up through the element by rotating the lobes through the use of a suitable prime mover (not shown) connected to the element 83.

Figure 2 further shows that the inner shaft 73 forms annular passages 84 and 85 by reduced diametral portions on either side of the medial portion 86 movable relative to the bore 72 but acting as a seal between the annular passages 84' and 85'.

Figure 5:
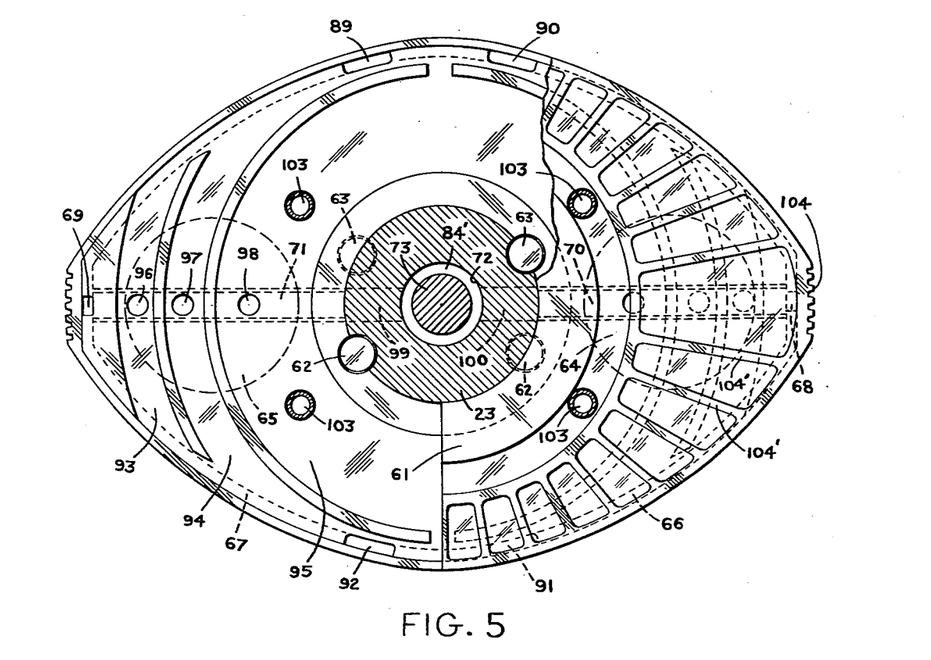
Figure 5 is an enlarged view of one end of the large lobe.

Annular passage 84 communicates between a fluid cooling supply chamber 87 receiving cooling fluid from the conduit 88 connected thereto, and the transverse inlet passages 70 and 71 so that cooling fluid will be led therethrough to the U-shaped cooling passages 66 and 67. The cooling fluid passes from the cooling passages 66 and 67 to common return ducts 89, 90, 91 and 92, shown in Figure 1 and Figure 5. The common return ducts 89, 90, 91 and 92 are disposed to communicate with side return canals 93, 94 and 95, as shown in Figure 5 which in turn open into the longitudinal passages 64 and 65 through openings 96, 97 and 98 so that cooling fluid passes from the return ducts and the side return canals to the longitudinal passages 64 and 65. From the passages 64 and 65, the cooling fluid goes through the transverse outlet passages 99 and 100 to the annular outlet passage 85'. The annular outlet passage 85' communicates with the annular chamber 101 between the relative motion damper 77 and the driven gear 122 and transverse outlets 102 so that fluid is fed continuously to the annular chamber to feed the relative motion damper 77 as hereinafter described and to the transverse outlets 102 whence it passes to the sump 46, all of which is clearly shown in Figures 1, 2 and 5 of the drawings.

The working lobe is also shown as having balancing passages 103 extending therethrough which act to balance the pressure between the sides of the working lobe and the adjacent inner wall of the cover elements 5 and 6. Figure 5 shows that the ends and the sides of the working lobe 25 are provided with sealing lands as at 104 and 104'.

It is clear from the above that the flow of the cooling fluid through the combustion lobe and the working lobe 25 differs somewhat, and this is due to the fact that the working lobe 25 will require a relatively lesser degree of cooling at the ends thereof than at the ends of the combustion lobe. Hence the warmer returning fluid is brought back through the longitudinal passage in the working lobe while cooler inlet fluid is used in the combustion lobe at this point.

*Relative motion damper*

The reason for the driving arrangement, i. e., the relation between shafts 23 and 73, and the relative motion damper 77 is to reduce the disturbances caused by vibration and torsional stresses in the engine shafting and thereby limit the distortion of the clearance space between the rotating lobes on which operational efficiency will depend.

Figures 6, 11, 12, 13:
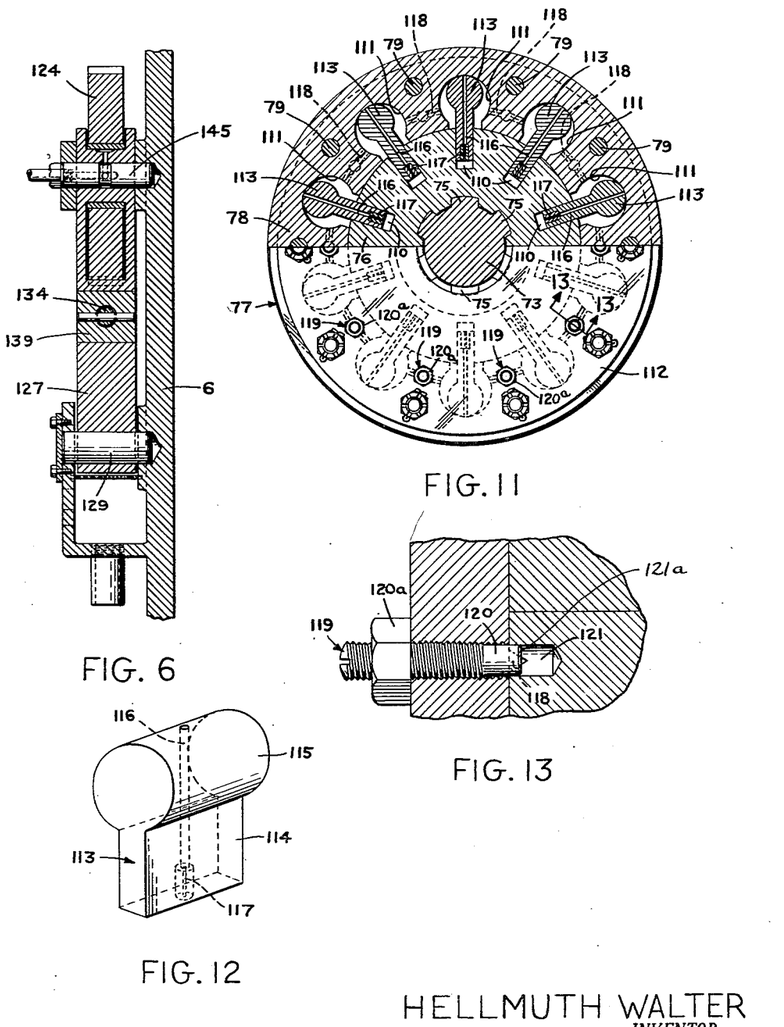
Figure 6 is a vertical section taken on line 6—6 of Figure 3 showing clearance and back lash adjusters.
Figure 11 is an end view of the relative motion dampener partly in section on line 10—10 of Figure 2.
Figure 12 is a perspective view of one of the vane elements in the dampener.
Figure 13 is an enlarged vertical section taken on line 13—13 of Figure 11.

Figures 11, 12 and 13 show that the relative motion damper is a substantially circumferential member having the outer element 78 annular in form to receive on its inner circumference for relative movement the inner element 76.

The inner element 76 has circumferentially disposed slots 110 which communicate with circumferentially spaced chambers 111 in the outer annular element 78 formed when closed by the damper cover 112. The chambers 110 open towards the inner circumference of the annular outer element 78, whereby vane elements 113 are adapted to be slidably disposed in said slots 110 and to extend into the respective chambers 111 communicating with the slots.

The vane elements 113 are identical in construction and accordingly only one is illustrated in Figure 12 as a member having a rectangular flat projection 114 integral with a cylindrical portion 115 through which the transverse passages 116 extend parallel to the axis of sliding movement. The passages 116 open at their upper ends into the outer surface of the cylindrical portions 115 and communicate at their lower ends with orifices or restrictions 117 which in turn open out of the inner end of the rectangular flat portions 114 slidably disposed in the slots 110.

The slots 110 all communicate through the annular chamber 101 between the driven gear 122 and the damper 77 with the annular passage 85'. Thus, cooling fluid received in the passage 85' will continuously pass to the slots 110. However, since each of the vanes 113 are provided with transverse passages 116 the fluid will also pass to the chambers 111 either by differential pressure or under centrifugal force, all of which is clearly shown in Figures 2 and 11 of the drawings.

Figures 11 and 13 further indicate that the chambers 111 have communicating V-shaped passages 118 therebetween. The fluid in the chamber 111 will be moved through these passages 118 from one chamber to the other under action of the vane elements 113 produced by the relative motion between the inner and outer elements 76 and 78 of the damper during rotation of the shafts 23 and 73. To dampen or reduce the amplitude of this relative motion between the inner and outer elements 76 and 78 and hence in the respective shafts 73 and 23 to which they are connected, throttling means 119 in each of the passages 118 are provided. These are shown specifically in Figure 13 only one of the throttling elements 120 being illustrated as they are all identical therewith.

Thus, each of the passages 118 have bores 121 disposed therein perpendicular of the path of fluid flow to form conical shaped seats 121a. The seats 121a are engaged by the tips of the throttle element 120 threadably mounted in the damper cover 112 and movable toward and away from said seats whereby the flow through the passages 118 will be restricted to produce the desired restriction of the relative motion between the respective shafts 23 and 73.

Locking nuts 120a hold the throttle element 120 in adjusted position.

In operation, centrifugal force throws the vanes 113 outwardly into the chambers 111, as relative motion occurs between the inner and outer elements 76 and 78, the vanes 113 tend to exert pressure on the fluid in the chambers 111 and the counteraction of the fluid against the vanes coupled with the tangential component of centrifugal force acting due to the change or offset of the vanes 113 in the chambers 111 caused by the relative motion, will give the desired damping effect between shafts 23 and 73.

The driven gears 122 and 123 engage idler gears 124 and 125 rotatably mounted at the respective ends of the arms 126 and 127 pivotally connected to the cover element 6 as at 128 and 129. By moving the arms 126 and 127 in the same direction, the relative rotation between the idler gears 124 and 125 and the driven gears 122 and 123 will cause sufficient relative rotation between the working lobe 25 and the combustion lobe 26, to establish the desired minimal and equally distributed clearances between the ends and sides of these lobes for producing optimum conditions of operation.

Conversely, when the arms 126 and 127 are moved towards or away from each other, that is, in opposite directions, the distance between the centers of the gears 124 and 125 will be increased or decreased, whereby back lash in the gear train is controlled without changing the position of the lobes 25 and 26.

To accomplish the desired movement and setting of the arms 126 and 127, two sets of adjusting screws to be operated contra each other, are provided. Thus adjusting screws 130 and 131 extend through the gear case 47 to abut the outer sides of the arms 126 and 127. Locking nuts 132 and 133 are provided to hold the adjusting screws 130 and 131 in adjusted position. Similarly, adjusting rods 134 and 135 extend through the gear case 47, into bores 136 and 137 formed on the same sides of the respective arms 126 and 127 abutted by the adjusting screws 130 and 131, to engage at their respective inner ends pin elements 138 and 139 disposed in the arms 126 and 127 transversely of the plane of movement thereof. Hex nuts 140 and 141 at the outer ends of the rods 134 and 135 are utilized to adjust the rods inwardly and outwardly, while spring elements 142 and 143 abut the ends 134 and 135 between the inner walls of the gear case and the adjacent sides of the arms 126 and 127 act to take up any slack in the adjusting means.

In making the adjustment for clearance and reducing back lash, by alternately or simultaneously threading the respective adjusting screws inwardly or outwardly, the arms 126 and 127 can be first moved to produce the desired clearance, and then adjusted to produce minimum back lash.

After the arms 126 and 127 have been adjusted and locked in position by means of the locking nuts 131 and 132 and hex nuts 140 and 141, a permanent and rigid positioning of the idler gears 124 and 125 is obtained by means of the transverse spacer bar 144 which is fixedly connected through the gears 124 and 125 to the cover plate or head 6 by means of pins 145, only one of which is illustrated in Figure 6, and a center bolt 146, all of the above being clearly shown in Figure 3 and Figure 6 of the drawings.

*Fuel pump*

The idler gear 124 engages and rotates a pinion 150 keyed to a shaft 151 which operatively connects to a fuel pump generally designated 152 and shown in Figure 1 of the drawings. The fuel pump 152 has its inlet 153 connected through a conduit 154 and filter 155 to a source of fuel (not shown). The fuel pump has its discharge outlets 156 connected by conduits 157 and 158 to a pilot fuel injection valve 159 and main fuel injection valves 160, respectively. These fuel injection valves 159 and 160, are mounted so as to extend through the inner casing 2, to open into the combustion cylinder 4 at the desired point. They will act to project fuel into the combustion cylinder 4 twice on each revolution of the working lobe 25 as will appear clear from the operation more fully described hereinafter.

Figure 1 also shows a spark plug retainer 161 extending through the cooling fluid jacket 15 and inner casing 2, at the desired point for mounting a spark plug or the like ignition means 162, so that the contacts 163 are disposed to ignite the combustible fuel and air mixture established in the combustion cylinder as hereinafter described, when current is delivered to the contacts 163 through the line 164 in the manner well known in the art.

The ignition means is disposed in the combustion cylinder 4 at a point beyond the main fuel injection members 160 in the direction of rotation of the combustion lobe 26 so that the lobe 26 will just barely close a combustion space in the combustion chamber 4 when the spark plug 162 will be exposed to produce combustion therein.

The pilot fuel injection valve 159 does not open directly into the combustion cylinder 4 but into a flame holding recess 165 struck or formed as an indentation in but continuous with the wall of the combustion cylinder 4. The flame-holding recess 165 will hold a small portion of the charge ignited in the combustion cylinder 4, and will provide means for substantially continuous combustion without the use of the ignition means 163 under suitable operational conditions and by regulating the delivery of the pilot-charge of fuel injected through the pilot fuel injection valve 159. In operation, as hereinafter described, it will appear clear therefore that the pilot fuel injection valve will serve a two-fold purpose, that of providing substantially continuous combustion and of providing smooth, uniform ignition of the mixture in the combustion space.

*Lubrication system, seal and cooling fluid supply*

The means for lubricating the bearing structures 23a, 23b, 24a and 24b also coacts with the pressure seals generally designated 190, 191, 192 and 193 and in addition supplies fluid to the cooling fluid means for the lobes.

The lubricating system will accordingly include any suitable type pump (not shown) of which there are many easily purchasable on the open market and hence the same is not shown or more fully described as they are well known in the art for this purpose.

The pump is driven continuously during the starting up and operation of the rotary combustion engine either independently or by connection off of one of the idler gears in the same manner as described above for the fuel pump 152.

The pump (not shown) will take its suction either directly or indirectly from the return outlets 170, 171 and 172 which return the lubricating and cooling fluid to the pump. The fluid will be any suitable type adapted for both purposes.

The pump (not shown) discharges to both the cooling fluid inlets 45 and 88 and the lubricating inlets 173, 174, 175, 176, 177, 178, 179 and 180.

From the cooling fluid inlets 45 and 88 the fluid passes through the various passages and chambers of the working lobe and the combustion lobe for heat exchange relation therewith as above described.

The fluid delivered to the inlets 174 and 178 enters the passages 181 and 182 which communicate with the main bearings 24c and 24d where it acts to lubricate the same returning through the return grooves 183 and 184 provided in the respective bearings 24c and 24d, which return grooves communicate with the respective lubricant return conduits 170 and 172 by gravity and differential pressure.

The fluid delivered to the inlet 173 passes into passages 185 and 185' and the fluid delivered to inlet 177 also passes to two passages 186 and 186'. The passages 185 and 186 communicate with guide bearings 24g and 24h, hence the fluid acts to lubricate these bearings returning by normal differential pressure and gravity to the sump 46 and return outlet 170. The fluid from the guide bearing 24g returns through communicating passage 187 to the return outlet 172.

The passages 185' and 186' communicate with sealing structures generally designated 190 and 191 and coact therewith by providing fluid to lubricate the same. The structure and operation of the sealing structures 190 and 191 for the combustion lobe 26 and the sealing structures 192 and 193 for the working lobe is more fully described hereinafter with reference to Figures 9 and 10 of the drawings which shows an enlarged view of one of the seals, the remaining seals are identical therewith hence only one is described and illustrated.

The fluid leading to the inlets 179 and 175 similarly is fed to the main bearings 23a and 23b for the working lobe through passages 194 and 195, while the fluid to the inlets 176 and 180 is conducted through the communicating passages 194' and 195' to the sealing means generally designated 192 and 193. It is returned by gravity and differential pressure to the sump 46 and return outlet 170 on one side and in auxiliary sump 196 and return outlet 171 on the other.

Sealing members

Figure 9:
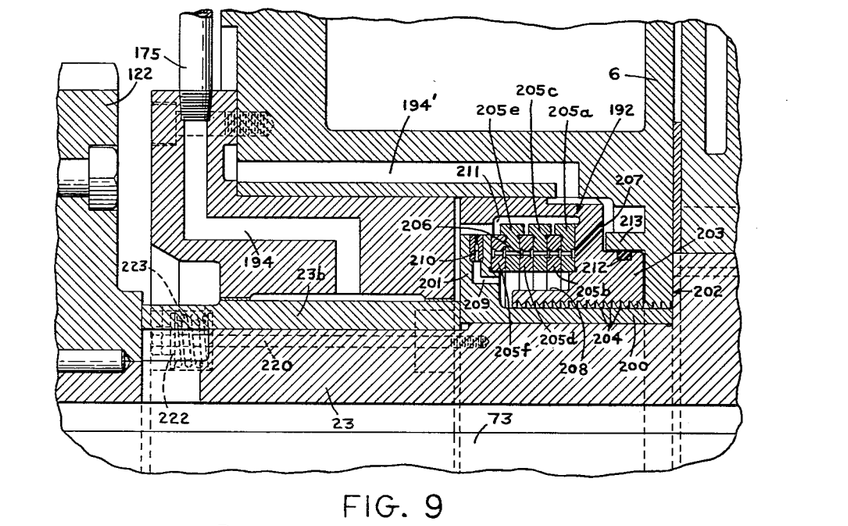
Figure 9 is a partial section of the lower bearing frame showing the lubrication passages.

One sealing member 192 is illustrated in an enlarged view of the type seal which is utilized to restrict and limit the leakage about the shafts 23 and 24 which results from the differential pressure which exists in the respective cylinders 3 and 4 and atmosphere during the operation of the present engine, as hereinafter described.

The seal 192 is thus shown as including an annular sleeve 200 shrunk-fit to the shaft 23 inwardly of the bearing 23b and with flange 201 adjacent its outer end. As clearly shown in Figures 2 and 9, the sleeve 200 extends through the closure head 6 and abuts against the shoulder 202 formed on the shaft 23. About the outer surface of the annular sleeve 200, is a slidable annular collar support 203 which has lands and grooves 204 forming a labyrinth type seal therewith. This is the first stage of the seal.

The main seal or second stage comprises a series of annular ring elements 205a to f which are supported between the flange 201 and the annular collar support 203, as is clearly shown in Figure 9. The annular ring elements 205a to f have transverse communicating passages 206, one of which has its inlet end communicating with the passage 194' through the connecting passage 207 whereby fluid from said passage 194' passes through the connecting passage 207 and transverse passage 206 to the annular rings 205a to f, which act as the sealing elements.

A certain amount of fluid leakage occurs and this drops into the annular chamber 208 formed adjacent the inner circumference of the annular ring elements 205a to f in the space formed between the sleeve 200 and the slidable collar 203 supporting the rings. By pressure difference this excess fluid is forced out through the escape passage 209 and orifice 210 to passage 211 where it joins the returning fluid from the annular ring elements 205 passing thence to the sump 46 by gravity and pressure differential.

An O-ring 212 in engagement with an annular projection 213 on the closure head 6 acts as an outer seal for the slidable collar element, all of the above being clearly shown in Figure 9 of the drawings.

Figure 10 of the drawings shows an elongated rod 220 slidably mounted in a bore 221 having the inner end connected to the slidable collar 203, while the outer end receives a stop element 222.

A spring 223 disposed between the outer surface of casing element 224 and the stop urges the rod element outward at all times so that the sliding collar element 203 will when stopped or during operation act to support the annular ring element 205 and still be able to fluctuate with variations in pressure differential.

The elongated rod 220 is only illustrative of one of the rods, other rods being circumferentially spaced about the seal 192, and each of the seals 190, 191 and 193, identical with the one above described are also provided with means to load the rings at all times.

In operation, when shaft 23 or 24 rotates, the respective annular sleeves 200 thereabout will also rotate. This causes the flange 201 thereof to rotate the adjacent ring 205f. However, by reason of the stop pins 225, as shown in Figure 2 of the drawings the slidable collar element 203 and its adjacent ring 205a are prevented from rotating as a result of which the rings 205b and 205c to 205e will rotate at only a part of the rotational speed of the shaft 23 or 24.

In addition to the action of the spring 223, internal gas forces during operation also act to load the rings 205a to f.

Operation

The operation is best described with reference to Figure 1 and Figures 14 through 19.

In Figure 1 it is clear that a suitable prime mover connected to the pulley or coupling 83 may be utilized to initiate rotation of the lobes until combustion begins.

Thus the pulley rotates the shafts 73 and 23, which in turn causes the working lobe 25 and driven gear 122 to rotate therewith. The driven gear 122 in turn drives through the idler gears 124 and 125, the gear 123 which is fixedly connected to the shaft 24 integral with the combustion lobe 26 and accordingly rotates the lobe 26 in accordance with the rotating relationship set up during the assembly of the lobes. The clearance space between the lobe ends and sides can be adjusted as above described through the adjusting screws 130, 131, 133, 134 and 135 and the related adjusting elements.

Figure 14:
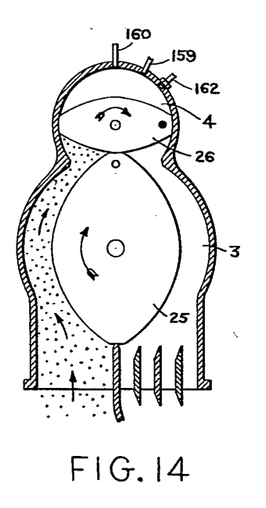
Figures 14, 15, 16, 17, 18, and 19 are diagrammatic sketches illustrating the various operational steps of the engine cycle.

As the lobes 25 and 26 rotate on the initial turn of the working lobe when they are in the position shown in Figure 14, air under a pressure which at a minimum will awys be slightly higher on the intake side than on the exhaust side and may be adjusted at higher pressures as desired or required, is delivered for compression through the inlet 7a. Figure 14 shows the working lobe positioned so that the suction inlet 7a and the adjacent exhaust outlet 7b are momentarily cut off from each other. The actual period of cut-off time being functions of the speed of rotation of the lobes.

To follow the rotation of the lobes, they have been marked, a black dot adjacent one end of the combustion lobe, and a small circle adjacent one end of the working lobe.

Figure 15:
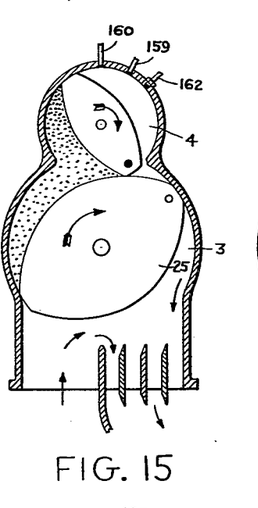

Figure 15 shows that continued rotation of the working lobe 25 acts to cut off or valve the air to begin the compression stage.

Figure 16:
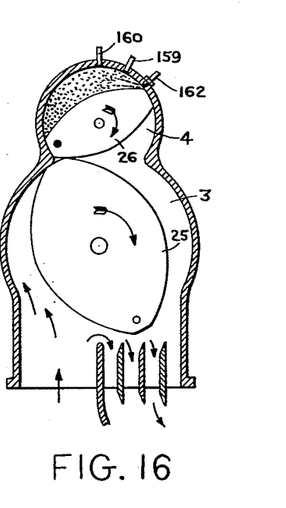

The air trapped between the lobes as shown in Figure 15 will on further rotation be compressed into the upper portion of the combustion cylinder 4 above the combustion lobe 26 when the lobe 26 reaches the position shown in Figure 16. However, as the lobe end passes the pilot injection valve 159, an initial injection of fuel will occur and as the lobe 26 uncovers the spark plug 162 and its contact 163, the main fuel valve opens to inject the main fuel charge but by reason of the pilot injection, combustion is effected immediately by passing current through line 164 to the contacts 163 in the usual manner and combustion of the mixture will be obtained.

Figure 17:
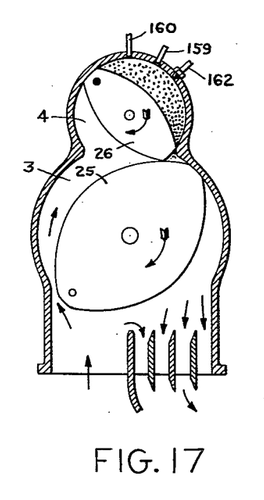

As the lobes 25 and 26 continue to rotate, the combustion of the air and fuel mixture at this constant volume produce pressures and temperatures in the combustion chamber 4 comparable to those obtained in the standard Otto cycle, until the lobe 26 opens the cut-out 22b and then expansion of the mixture begins, as is indicated in Figure 17 of the drawings.

At this point the working lobe and the combustion lobe have completed approximately ⅝ of a revolution as indicated by the circle on the working lobe 25 and the dark dot on the combustion lobe 26.

Since air under pressure is being delivered to the suction inlet 7a at all times, it will be beginning the second cycle by filling the compression space between the lobes, as shown in Figures 16 and 17.

Figure 18:
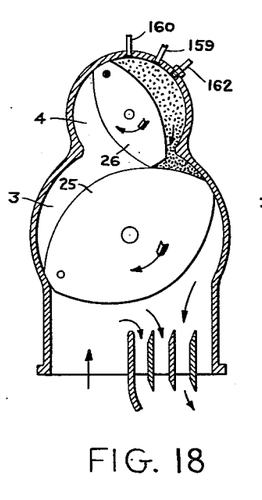

The expansion stage of the first cycle will act to rotate the working lobe 25 and when it reaches the position shown in Figure 18, the compression stage of the second cycle is by the valving action of the working lobe 25, identical to the same stage as shown in Figure 15 of the first cycle.

Figure 19:
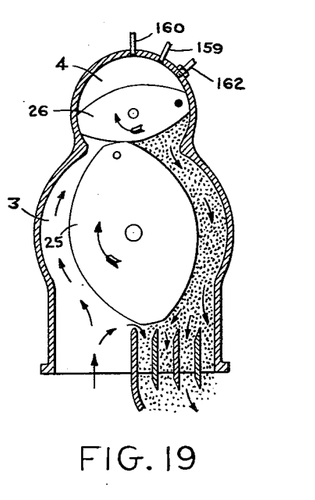

Figure 19 shows the expansion stage completing itself, the air acting to scavenge any of the remaining exhaust gases and to cool the gases so they will be acceptable for use in driving a turtine or other commercial application. Figure 19 shows that simultaneously with this exhaust and scavenging, combustion of the air-fuel mixture of the second cycle will be in progress, and the air will in addition to scavenging the exhaust gases, act to fill the compression space between the lobes in preparation for the third cycle as above described for the first cycle.

The third, fourth, fifth, etc. cycles will be repetitious of those above described, one cycle commencing in the first half of a revolution of the working lobe and the second cycle commencing in the second half of the revolution of the working lobe.

It will be observed that after combustion cycles follow each other by short intervals then the flame holder recess 165 will act to sustain continuous combustion from cycle to cycle, and the ignition means 162 may therefore be cut off.

The leakage between the respective stages will be norminal because the interacting lobe faces will have relatively low differential pressure on either side thereof, and the relative higher pressures and high temperatures developed by the combustion at constant volume are substantially sealed between the combustion lobe and the cylinder wall and not between interengaging lobe faces.

The width of the inlet 7a and discharge outlet relative to the working cylinder, is indicated as being relatively wide, this structure is necessary to allow sufficient time, by reason of the speed of the engine to complete intake and scavenging of exhaust.

The portions 22a and 22b indicated in the throat of the communicating passageway 22 between the working cylinder 3 and combustion cylinder 4 which serve to avoid trapping air at high pressure or the production of a vacuum, may of course be modified to avoid the necessity of cutting back or enlarging the passageway 22 by the use of bores disposed at these points which communicate between the working cylinder 3 and combustion cylinder 4 at the desired location.

It will be understood that the invention is not to be limited to the specific construction or arrangement of parts shown, but that they may be widely modified within the invention defined by the claims.

What is claimed is:

1. In a rotary type combustion engine, a working cylinder and a combustion cylinder, a working lobe rotatably mounted in said working cylinder, a combustion lobe rotatably mounted in said combustion cylinder, said working lobe and combustion lobe adapted to coact with each other to form a space for compression a space for combustion and a space for expansion in said engine, a suction inlet communicating with said working cylinder to deliver air thereto, an exhaust outlet communicating with said working cylinder and in substantially continuous communication with said suction inlet, and said lobes having minimum clearance therebetween at all times.

2. In a rotary type combustion engine, a working cylinder and a combustion cylinder, a working lobe rotatably mounted in said working cylinder, a combustion lobe rotatably mounted in said combustion cylinder, a suction inlet communicating with said working cylinder to deliver air thereto, an exhaust outlet communicating with said working cylinder and in substantially continuous communication with said suction inlet, said lobes having surfaces and ends adapted to coact with each other and with said cylinders to form a space for compression a space for combustion and a space for expansion in said cylinders, and adjusting means connected to said lobes to establish clearances between said surfaces and ends for optimum operating conditions.

3. In a rotary type combustion engine as claimed in claim 2 wherein said adjusting means includes, spaced gears, one connected to a working lobe and the other to the combustion lobe, idler gears in engagement with said spaced gears and adapted to be pivoted in the same direction for rotating said spaced gears by differential force to provide the desired clearance between the sides and edges of said lobes.

4. In a rotary type combustion engine as claimed in claim 2 wherein said adjusting means includes, spaced gears, one connected to the working lobe and the other to the combustion lobe, idler gears in engagement with said spaced gears, means for pivoting said idler gears in the same direction and in opposite direction, pivotal movement of said idler gears in the same direction adapted to rotate said spaced gears by differential force to provide the desired clearance between the sides and edges of said lobes, and pivotal movement of said idler gears in opposite directions adapted to adjust back lash between said spaced and said idler gears.

5. In a rotary type combustion engine, a working cylinder and a combustion cylinder, a working lobe rotatably mounted in said working cylinder, a combustion lobe rotatably mounted in said combustion cylinder, said working lobe and combustion lobe adapted to coact with each other to form a space for compression a space for combustion and a space for expansion in said engine, a suction inlet communicating with said working cylinder to deliver air thereto, an exhaust outlet communicating with said working cylinder and in substantially continuous communication with said suction inlet, said suction inlet and exhaust outlet relatively wide with respect to said working cylinder to facilitate charging of the compression space and discharging from the expansion space at the high rotational speeds of the lobes, and said lobes having minimum clearance between the coacting end and faces thereof at all times.

6. In a rotary type combustion engine, a working cylinder and a combustion cylinder, a working lobe rotatably mounted in said working cylinder, a combustion lobe rotatably mounted in said combustion cylinder, said working lobe and combustion lobe adapted to coact with each other to form a space for compression a space for combustion and a space for expansion in said engine, a suction inlet communicating with said working cylinder to deliver air thereto, an exhaust outlet communicating with said working cylinder and in substantially continuous communication with said suction inlet, said suction inlet and exhaust outlet having a cross-sectional area greater than ½ the widest dimension of said working cylinder to facilitate charging of the compression space and discharging from the expansion space at the high rotational speeds of the lobes, and said lobes having minimum clearances therebetween at all times.

7. In a rotary type combustion engine as claimed in claim 6 having adjusting means to provide the desired minimum clearances between the ends and faces of said lobes.

8. In a rotary type combustion engine, a working cylinder and a combustion cylinder, a working lobe rotatably mounted in said working cylinder, a combustion lobe rotatably mounted in said combustion cylinder, said working lobe and combustion lobe adapted to coact with each other to form a space for compression a space for combustion and a space for expansion in said engine, a suction inlet communicating with said working cylinder to deliver air thereto, an exhaust outlet communicating with said working cylinder and in substantially continuous communication with said suction inlet, said suction inlet and exhaust outlet having a cross-sectional area greater than ½ the widest dimension of said working cylinder to facilitate charging and expansion from said working cylinder at the high rotational speeds developed by the lobes during the combustion cycle in said engine, and adjusting means connected to said lobes to establish clearances therebetween for optimum operating conditions including, spaced gears, one connected to said working lobe and the other to the combustion lobe, idler gears in engagement with said spaced gears and adapted to be pivoted in the same direction for rotating said spaced gears by differential force to provide the desired clearence between said lobes.

9. In a rotary type combustion engine, a working cylinder and a combustion cylinder, a working lobe rotatably mounted in said working cylinder, a combustion lobe rotatably mounted in said combustion cylinder, said working lobe and combustion lobe adapted to coact with each other to form a space for compression a space for combustion and a space for expansion in said engine, a suction inlet communicating with said working cylinder to deliver air thereto, an exhaust outlet communicating with said working cylinder and in substantially continuous communication with said suction inlet, said suction inlet and exhaust outlet having a cross-sectional area greater than ½ the widest dimension of said working cylinder to facilitate charging and expansion from said working cylinder at the high rotational speeds developed by the lobes during the combustion cycle in said engine, and adjusting means connected to said lobes to establish clearances therebetween for optimum operating conditions including, spaced gears, one connected to said working lobe and the other to the combustion lobe, idler gears in engagement with said spaced gears, means for pivoting said idler gears in the same direction and in opposite directions, pivotal movement of said idler gears in the same direction adapted to rotate said spaced gears by differential force to provide the desired clearance between said lobes, and pivotal movement of said idler gear in opposite directions adapted to adjust back lash between said spaced and said idler gears.

10. In a rotary type combustion engine, a working cylinder and a communicating combustion cylinder, said working cylinder having a suction inlet communicating with a source of air under pressure greater than said exhaust pressure, an exhaust outlet for said working cylinder in substantially continuous communication with said suction inlet, a working lobe rotatably mounted in said working chamber, a combustion lobe rotatably mounted in said combustion cylinder to coact with said working lobe to delineate a space for compression a space for combustion and a space for expansion in said cylinders, said lobes and said cylinders so constructed and arranged that a fixed ratio of compression within the desired limits may be established, and said lobes having minimum clearances between the coacting ends and faces thereof.

11. In a rotary type combustion engine, a casing having a working cylinder and a communicating combustion cylinder, a working lobe rotatably mounted in said working cylinder, a combustion lobe rotatably mounted in said combustion cylinder, a suction inlet for said working cylinder for delivering air thereto at pressure at all times higher than said exhaust pressure, an exhaust outlet for said working cylinder in substantially continuous communication with said suction inlet, said lobes having surfaces and ends adapted to coact with each other and with said cylinders to form compression combustion and expansion spaces in said cylinders, said surfaces and ends of said lobes having clearances therebetween for optimum operating conditions, and by-pass forming means at the points of communication between the walls of said cylinders to prevent the formation of power loss producing pockets during the rotation of said lobes in the cylinders.

12. In a rotary type combustion engine as claimed in claim 9, having adjusting means connected to said lobes to establish the desired clearance between said surfaces and ends of the lobes.

13. In a rotary type of combustion engine, a casing having a working cylinder and a communicating combustion cylinder, a working lobe rotatably mounted in said working cylinder, a combustion lobe rotatably mounted in said combustion cylinder, said lobes having surfaces and ends adapted to coact with each other and with said cylinders to form a space for compression a space for combustion and a space for expansion in said cylinders, a suction inlet for said working cylinder for delivering air into said compression space, an exhaust outlet for said working cylinder in continuous connection with said suction inlet to exhaust combustion gases from said exhaust space, said suction inlet and exhaust outlet having a cross-sectional area at least greater than ½ of the cross-sectional area of said working cylinder, adjusting means connected to said lobes to establish clearances between said surfaces and ends for optimum operating conditions, and by-pass forming means at the points of communication between the walls of said cylinders to prevent the formation of power loss producing pockets during the rotation of said lobes in the cylinders.

14. In a rotary type combustion engine, a casing having a working cylinder and a communicating combustion cylinder, a working lobe rotatably mounted in said working cylinder, a combustion lobe rotatably mounted in said combustion cylinder, said lobes having surfaces and ends adapted to coact with each other and with said cylinders to form a space for compression a space for combustion and a space for expansion in said cylinders, a suction inlet for said working cylinder for delivering air into said compression space, an exhaust outlet for said working cylinder in continuous connection with said suction inlet to exhaust combustion gases from said exhaust space, a cooling jacket forming cooling passages about said casing, and yieldable means connecting adjacent ends of said casing and cooling jacket to act as a closure for said cooling passages and to allow for expansion and contraction between said casing and cooling jacket.

15. In a rotary type combustion engine as claimed in claim 14, wherein said cooling jacket is provided with inlets and an outlet for the cooling passages therein, valves for said inlets adjacent the suction inlet and exhaust outlet of said engine to control the relative flow of fluid through said cooling passages to secure substantially uniform temperature in said engine at the suction inlet and exhaust outlet portions thereof.

16. In a rotary type combustion engine, a casing having a working cylinder and a communicating combustion cylinder, a working lobe rotatably mounted in said working cylinder, a combustion lobe rotatably mounted in said combustion cylinder, said lobes having surfaces and ends adapted to coact with each other and with said cylinders to form a space for compression a space for combustion and a space for expansion in said cylinders, a suction inlet for said working cylinder for delivering air into said compression space, an exhaust outlet communicating with said working cylinder and in substantially continuous communication with said suction and inlet for exhausting combustion gases from said expansion space, said lobes having minimum clearances therebetween at all times, and means for independently cooling said lobes.

17. In a rotary type combustion engine, a casing having a working cylinder and a combustion cylinder, means for cooling said casing, a working lobe rotatably mounted in said working cylinder, a combustion lobe rotatably mounted in said combustion cylinder, said lobes having surfaces and ends adapted to coact with each other and with said cylinders to form a space for compression a space for combustion and a space for expansion in said cylinders, a suction inlet for said working cylinder for delivering air into said compression space, an exhaust outlet communicating with said working cylinder and in substantially continuous communication with said suction inlet and for exhausting combustion gases from said expansion space, said lobes having minimum clearances therebetween at all times, and means for independently cooling said lobes.

18. In a rotary type combustion engine as claimed in claim 16 wherein said cooling means includes, a pump connected to a source of cooling fluid, inlet means for each of said lobes communicating with said pump to receive cooling fluid therefrom, ports and passages in each of said respective lobes to lead said cooling fluid therethrough, and outlets for said lobes connected to said source of cooling fluid to return the same thereto.

19. In a rotary type combustion engine, a working cylinder and a combustion cylinder, a working lobe rotatably mounted in said working cylinder, a combustion lobe rotatably mounted in said combustion cylinder, a suction inlet communicating with said working cylinder to deliver air thereto, an exhaust outlet communicating with said working cylinder and in substantially continuous communication with said suction inlet, said lobes having surfaces and ends adapted to coact with each other and with said cylinders to form a space for compression a space for combustion and a space for expansion in said cylinders, said lobes having minimum clearance between said surfaces and ends for optimum operating conditions, and means on the ends and surfaces of said lobes acting to seal between said lobes and between said lobes and the walls of the respective cylinders.

20. In a rotary type combustion engine as claimed in claim 19 wherein said sealing means on the ends and surfaces of said lobes include, longitudinally disposed lands on the sides of said combustion lobes, axially disposed lands on the respective ends of both said combustion and working lobes, said combustion lobes having accurately shaped corners adapted to coact with the lands and downs on the ends thereof whereby effective sealing will be produced between the surfaces of said working lobe and the wall of said combustion cylinder.

21. In a rotary type combustion engine, a working cylinder and a combustion cylinder, a working lobe rotatably mounted in said working cylinder, a combustion lobe rotatably mounted in said combustion cylinder, said working lobe and combustion lobe adapted to coact with each other to form a space for compression a space for combustion and a space for expansion in said engine, a suction inlet communicating with said working cylinder to deliver air thereto, an exhaust outlet communicating with said working cylinder and in substantially continuous communication with said suction inlet, said lobes having minimum clearance between the coacting surfaces and ends at all times, and a flame holder adapted to communicate with said combustion space to sustain combustion in said engine.

22. In a rotary type combustion engine, a working cylinder and a combustion cylinder, a working lobe rotatably mounted in said working cylinder, a combustion lobe rotatably mounted in said combustion cylinder, said working lobe and combustion lobe adapted to coact with each other to form a space for compression a space for combustion and a space for expansion in said engine, a suction inlet communicating with said working cylinder to deliver air thereto, an exhaust outlet communicating with said working cylinder and in substantially continuous communication with said suction inlet, said lobes having minimum clearance between the coacting surfaces and ends at all times, a main fuel charging means opening into said combustion cylinder to deliver fuel thereto, an ignition means spaced from said main fuel charging means and positioned adjacent the outer edge of the combustion space formed by said lobe in the combustion cylinder, and auxiliary fuel charging means between said main charge and said ignition means to deliver a pilot charge of fuel before each main fuel charge for establishing uniform combustion.

23. In a rotary type combustion engine as claimed in claim 22 wherein a flame holder disposed off said combustion cylinder in the approximate position of said ignition means and communicating therewith will act to provide continuous combustion when said ignition means is rendered inoperative.

24. In a rotary type combustion engine, a casing having a working cylinder and a combustion cylinder, a working lobe rotatable in said working cylinder, a combustion lobe rotatable in said combustion cylinder, means for adjusting the clearance between said lobes including spaced gears one connected to said working lobe and one connected to said combustion lobe, and idler gears engaging said spaced gears and to be pivoted in the same direction for establishing clearances between said lobes by different force between said gears, and means for charging said combustion cylinder with fuel including a fuel pump driven off one of said idler gears.

25. In a rotary type combustion engine, a casing having a working cylinder and a communicating combustion cylinder, a first shaft rotatably mounted in the axial line of said combustion chamber, a combustion lobe in said combustion chamber mounted on and rotatable with said first shaft, a second shaft rotatably mounted in the axial line of said working cylinder, a working lobe in said working cylinder mounted on and rotatable with said second shaft, said second shaft including an outer member and a comparatively flexible inner member connected to and rotatable with said outer member, and means connected to said members to dampen the vibratory and torsional effect therebetween during rotation of said second shaft.

26. In a rotary combustion engine as claimed in claim 25 wherein said damping means includes, an outer annular element connected to said outer member, an inner element connected to said inner member and circumferentially slidable in said outer element, circumferentially-spaced slots on the outer periphery of said inner element, circumferentially spaced chambers in said outer element communicating with said slots, a slidable element in each of said slots to be urged into said spaced chambers under centrifugal force, said slots and chambers communicating with a source of hydraulic fluid to fill said space at all times, flow passages formed between said spaced chambers to move fluid therebetween under action of said slidable elements, and means to throttle said flow passages to control the quantity of fluid moved between said chambers.

27. In a fluid operated dampener for two coacting rotatable shafts to reduce vibration or torsional effects therebetween, an outer annual element connected to one of said coacting shafts, an inner element circumferentially slidable in said outer element connected to the other of said coacting shafts, circumferentially spaced slots on the outer periphery of said inner element, circumferentially spaced chambers in said outer annular element opening on the inner circumference thereof, said chambers communicating with a source of hydraulic fluid at all times, passage means in said outer element providing communication between said spaced chambers, slidable elements in said slots to be urged outwardly during rotation of said shafts and to move fluid between said chambers, and means to restrict the flow of fluid in said passages.

28. In a rotary type combustion engine, a working cylinder and a communicating combustion cylinder, a suction inlet and an exhaust outlet for said working cylinder in substantially continuous communication with each other, a first rotary element rotatably mounted in said combustion cylinder, a second rotary element rotatably mounted in said working cylinder coacting with said first rotary element to delineate a combustion cycle in said engine, bearings for said rotary elements, means for lubricating said bearings, and sealing means coacting with said lubricating means to prevent leakage of combustion gases during said combustion cycle.

29. In a rotary type combustion engine as claimed in claim 28 wherein said sealing means includes an annular element fixedly connected to and rotatable with said rotary element having a flange on the end thereof remote from said rotary element, a slidable and non-rotatable collar about said annular element, a series of adjacent annular rings mounted between said non-rotatable collar and said flange, and passage means connecting said rings to said lubricating system.

30. In a rotary type combustion engine as claimed in claim 28 wherein said sealing means includes an annular element fixedly connected to and rotatable with said rotary element having a flange on the end thereof remote from said rotary element, a slidable and non-rotatable collar about said annular element, a series of adjacent annular rings mounted between said non-rotatable collar and said flange, passage means connecting said rings to said lubricating system, and means for returning leakage from said rings back to said lubrication system.

31. In a rotary type combustion engine as claimed in claim 28 wherein said sealing means includes an annular element fixedly connected to and rotatable with said rotary element having a flange in the end thereof remote from said rotary element, a slidable and non-rotatable collar about said annular element, a series of adjacent annular rings mounted between said non-rotatable collar and said flange, passage means connecting said rings to said lubrication system, and means connected to said slidable collar to maintain said annular rings in engagement with each other and between said collar and flange at all times.

32. In a rotary type combustion engine, a working cylinder and a combustion cylinder, a working lobe rotatably mounted in said working cylinder, a combustion lobe rotatably mounted in said combustion cylinder, a suction inlet communicating with said working cylinder to deliver air thereto, an exhaust outlet communicating with said working cylinder and in substantially continuous communication with said suction inlet, said lobes having surfaces and ends adapted to coact with each other and with said cylinders to form a space for compression a space for combustion and a space for expansion in said cylinders, and vanes disposed in said exhaust outlet for producing ejector action to facilitate cooling and scavenging of exhaust gases and charging of said compression space during the combustion cycle of said engine.

33. In a rotary combustion engine, a working cylinder and a combustion cylinder, a working lobe rotatably mounted in said working cylinder, a combustion lobe rotatably mounted in said combustion cylinder, a suction inlet communicating with said working cylinder to deliver air thereto, an exhaust outlet communicating with said working cylinder and in substantially continuous communication with said suction inlet, said lobes having surfaces and ends adapted to coact with each other and with said cylinders to form a space for compression a space for combustion and a space for expansion in said cylinders, and vanes disposed in said exhaust outlet in spaced relation to each other to divide the same into sections, at least one of said sections adapted to coact with said suction inlet to effect ejector action during exhaust on air being introduced therethrough.

34. The method of designing cylinders and lobes for a rotary combustion engine which comprises the steps of circumscribing two concentric circles of arbitrary diameters, circumscribing a third circle of arbitrary diameter less than that of the concentric circles on a center a spaced distance from the center for said concentric circles such that the circumference of said third circle is contiguous to the circumference of the inner of said concentric circles, and forming a small lobe and a large lobe in said circles having radii of curvature equal to said spaced distance between the respective centers of said circles.

35. The method of designing cylinders and lobes for a rotary combustion engine to secure an approximate desired compression ratio which comprises the steps of circumscribing two concentric circles of arbitrary diameters on the same centers, circumscribing a third circle of an arbitrary diameter less than that of the concentric circles on a center a spaced distance from the center for said concentric circles such that the circumference of said third circle is contiguous to the circumference of the inner of said concentric circles, inscribing said third circle on the same center as said concentric circles, forming the shape of a combustion lobe for said engine by radii to intersect said inscribed circle from points formed by the intersection of a line passing through each of said centers and the circumference of the larger of said concentric circles, and forming the working lobe for said engine by striking radii from the points where the first mentioned radii intersect said inscribed circle and extending the same to a point tangent to the smaller of said concentric circles.

36. The method of designing cylinders and lobes for a rotary combustion engine to secure an approximate desired compression ratio which comprises the steps of circumscribing two concentric circles of arbitrary diameters on the same centers, circumscribing a third circle of an arbitrary diameter less than that of the concentric circles on a center a spaced distance from the center for said concentric circles such that the circumference of said third circle is contiguous to the circumference of the inner of said concentric circles, inscribing said third circle on the same center as said concentric circles, forming the shape of a combustion lobe for said engine by striking radii to intersect said inscribed circle from points equally spaced from the intersection of a line passing through each of said centers and the circumference of the larger of said concentric circles tangent to a fourth inscribed circle having the same center as said concentric circles, and forming the working lobe for said engine by striking radii from the points where the first mentioned radii intersects said inscribed third circle and extending the same to a point tangent to the smaller of said concentric circles.

37. In the method of designing cylinder and lobes for a rotary type combustion engine to secure an approximate compression ratio as claimed in claim 36 wherein the compression ratio can be calculated from the respective areas between the lobes and the outer circumferences of the circles confining said lobes when they are theoretically rotated to form compression and combustion spaces.

References Cited in the file of this patent

UNITED STATES PATENTS

| Number | Name | Date |
|---|---|---|
| 922,875 | Fraser | May 25, 1909 |
| 924,897 | Emmet | June 15, 1909 |
| 932,463 | Goyette | Aug. 31, 1909 |
| 1,003,263 | Humphreys | Sept. 12, 1911 |
| 1,264,408 | McCaskill | Apr. 30, 1918 |
| 1,618,655 | Halvorsen | Feb. 22, 1927 |
| 1,636,050 | Fottinger | July 19, 1927 |
| 1,968,729 | Winsor et al. | July 31, 1934 |
| 2,159,766 | Larrecq | May 23, 1939 |
| 2,164,462 | Lutschg | July 4, 1939 |
| 2,305,439 | Miller | Dec. 15, 1942 |
| 2,307,506 | Huntington | Jan. 5, 1943 |
| 2,497,781 | Logashkin | Feb. 14, 1950 |
| 2,564,503 | Rice | Aug. 14, 1951 |
| 2,627,161 | Lindhagen et al. | Feb. 3, 1953 |
| 2,711,914 | Summers | June 28, 1955 |
| 2,727,765 | Kilpatrick | Dec. 20, 1955 |

FOREIGN PATENTS

| Number | Country | Date |
|---|---|---|
| 356,724 | Germany | Mar. 12, 1920 |